Oct. 17, 1961     H. P. GREGOR ET AL     3,004,909
ELECTROPOSITIVE SELECTIVE PERMEABLE
MEMBRANE AND METHOD OF PRODUCTION
Filed June 8, 1955
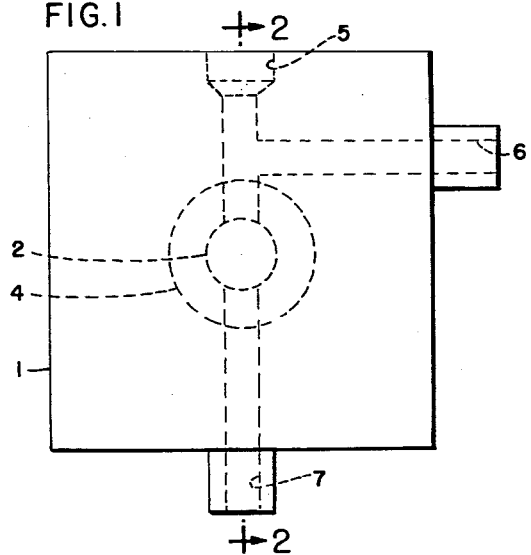
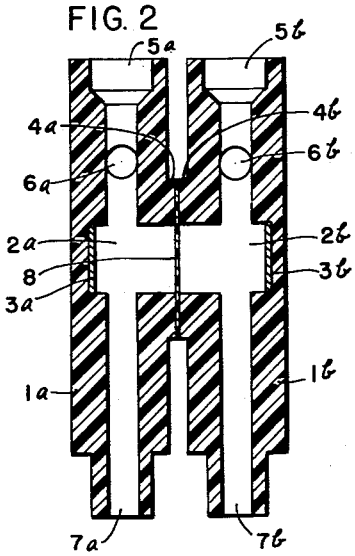
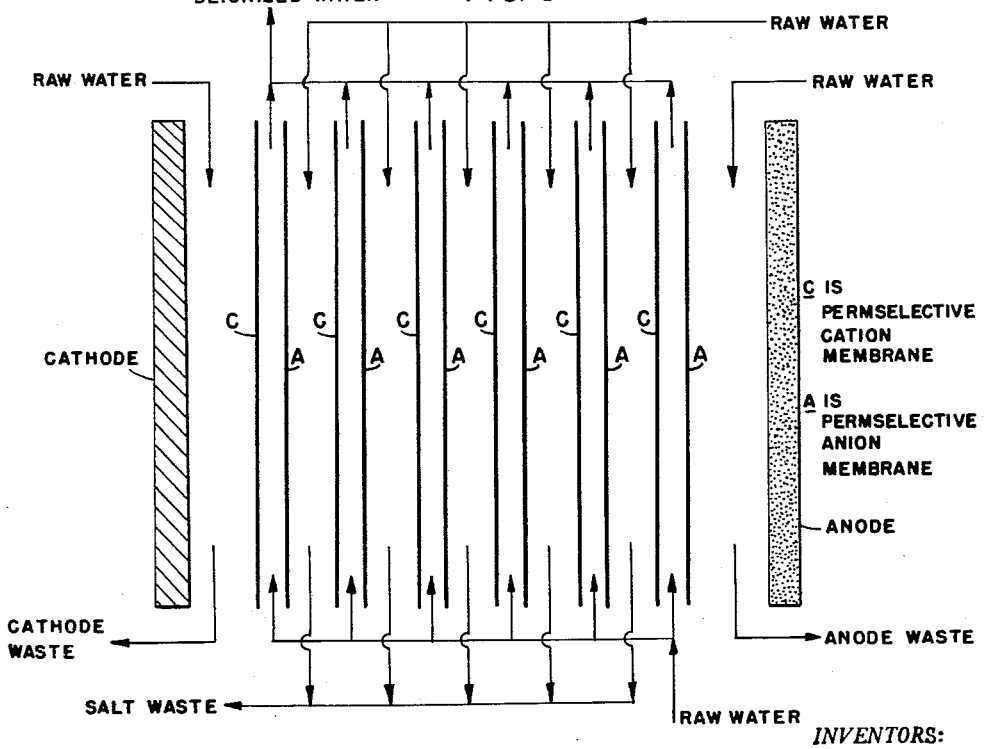
INVENTORS:
HARRY P. GREGOR
HAROLD I. PATZELT
BY    ATT'YS 3,004,909
ELECTROPOSITIVE SELECTIVE PERMEABLE MEMBRANE AND METHOD OF PRODUCTION
Harry P. Gregor, Hewlett, N.Y., and Harold I. Patzelt, Chicago, Ill., assignors to Nalco Chemical Company, a corporation of Delaware
Filed June 8, 1955, Ser. No. 513,944
15 Claims. (Cl. 204—180)

This invention relates to ion exchange membranes and the method of producing the same. More particularly, it relates to electropositive ion selective barriers having high permselectivities and low ohmic resistances.

Ion exchange membranes have been known for numerous years and their applications have been limited in the most part to laboratory investigations. In the past few years they have become the subject of considerable discussion, and their use in various fields has led to intensive investigations of these materials.

The electrical behavior of ion exchange membranes is usually explained on the basis of a fixed-charge theory which is also generally accepted as the operative principle of ion exchange resins. This theory may be briefly described as follows:

The walls of the pores of the membranes carry a definite number of potentially dissociable groups: acidic groups, such as carboxylic groups, in the case of the electronegative membranes, and basic groups, such as amino groups, in the case of the electropositive membranes. These dissociable groups are an integral part of the membrane structure. They are compensated electrically by counter ions of the opposite charge. The characteristic electrical effects are due to the fact that the fixed ionized wall groups are unable to participate in the transportation of electricity across the membrane. Any current which flows is transported by the counter ions of the fixed-charge wall groups and whatever other electrolyte may be present in the pores. The concentration of this additional electrolyte in the pores depends upon the size of the pores, the charge density on the pore walls, and the concentration and nature of the electrolyte in the external solution.

In membrane terminology the term "critical" ions is used to denote the actual or potential counter ions of the fixed dissociable wall groups of a membrane. Ions identical in sign with the wall groups are denoted as "noncritical" ions. Thus in an anion membrane or an electropositive barrier type material, the noncritical ions would be cations and the critical ions would be anions.

An ideal membrane would be one in which the noncritical ions would be blocked from moving all the way across the membranes, and thus from taking part in the conductivity in the membrane phase. Fixed charges block this noncritical ion movement across the membrane, and thus it becomes apparent that if the number of fixed wall charges is high enough and the pores are small enough, the fixed charge within the pore will block off effectively any movement of noncritical ions across the membrane. The electrochemical properties of the membranes are therefore dependent, to a great extent, on the geometry of their pore systems and the distribution, number, and the charge of the fixed-charge groups.

If a membrane is interposed between two solutions of different concentrations of the same electrolyte, an electromotive force arises which is different in most instances from the liquid junction potential originating between the solutions in the absence of the membrane. The electromotive force which arises in such membrane concentration cells is customarily referred to as the concentration potential. The sign and magnitude of this potential depends upon the nature of electrolyte, the concentration ratio of the two solutions, their absolute concentrations, and on the nature of the membrane.

If the membrane has poor permselectivity, the potential between the two solutions drops toward the liquid junction potential; i.e., the membrane for all practical electrical purposes does not separate the two solutions. When the permselectivity of the membrane, on the other hand, is such that the two solutions may be considered as being completely separated, then the potential approaches the thermodynamic maximum value; i.e., the value of the EMF which would arise if the two solutions were completely separated by a nonpermeable phase. Thus the thermodynamically possible maximum value of the concentration potential represents the upper limit of the possible membrane potential, and the liquid junction potential represents the lower limit.

The permselectivity of an electropositive membrane is a measure of its ability to pass anions to the exclusion of cations, high permselectivity being desired. The permselectivity is calculable from the transport number of the mobile ion, and the transport number can be correlated with the membrane concentration potential in a modified Nernst equation. By measuring the concentration potential, the transport number can be arrived at using the equation. The transport number is an index of the permselectivity and serves for evaluation of a membrane. If desired, further calculation of the permselectivity from the transport number may be carried out, but it is unnecessary to the evaluation.

In the case of a uni-univalent electrolyte and an anion permeable membrane $$E = (t_- - t_+)\frac{RT}{F}\ln\frac{a_2}{a_1}$$

where $E$ = the measured concentration potential with but slight error for electrode potential and liquid junction potential; E is corrected, in the present evaluations
$t_+$ = cation transport number
$t_-$ = anion transport number
$a_2$ = activity of the electrolyte in the more concentrated solution (calculated from the electrolyte concentration and the activity coefficient)
$a_1$ = activity of the electrolyte in the less concentrated solution
$R$ = the gas constant
$T$ = the absolute temperature
$F$ = Faraday's constant (96,489 coulombs per gram equivalent)

Since $t_- = 1 - t_+$, the equations for the respective transport numbers are $$E = (1 - 2t_+)\frac{RT}{F}\ln\frac{a_2}{a_1}$$

$$E = (2t_- - 1)\frac{RT}{F}\ln\frac{a_2}{a_1}$$

And since the theoretical ideal membrane potential may be calculated from a simplified Nernst equation for reversible electrode potentials:

$$E_0 = \frac{RT}{F}\ln\frac{a_2}{a_1}$$

Therefore:

$$\frac{E}{E_0} = 1 - 2t_+ = 2t_- - 1$$

Solving for the transport numbers $$t_- = \frac{E + E_0}{2E_0} \text{ and } t_+ = \frac{E_0 - E}{2E_0}$$

In this manner, the transport numbers reported hereinafter were calculated from the measured concentration potentials.

Another property of permselective membranes, which is a direct criterion of their usefulness, is their ohmic resistance when at equilibrium with various electrolyte solutions. The resistance, or more specifically the conductance calculated therefrom, permits an accurate quantitative measure of the relative ionic permeability. A very low resistance is highly desirable in an ion exchange membrane.

In order to assure that an electropositive barrier has a high permselectivity and a low ohmic resistance, it is desirable that the membrane material be as thin as possible, while still possessing the other properties mentioned. The prior art has suggested collodion as a suitable material for making membranes or electronegative barriers. While this material has enabled membrane phenomena to be investigated the material is unsatisfactory due to its poor resistance to strong acids and alkalies. Also, these and other prior ionic membranes have been produced by providing the ionic functional groups thereon after formation of the membrane body, by treating the membrane by oxidation or by adsorption of ionic materials thereon. Recently, finely ground ion exchange resins have been impregnated on chemically inert matrices and have shown promise in the field of the membranes. These materials, however, while having the satisfactory electrochemical properties, are nevertheless undesirably thick.

It is therefore an object of the invention to provide a new and improved electropositive selective permeable membrane or anion exchange membrane and method of producing the same which overcome the disadvantages of prior membranes.

An important object of the present invention is to provide an anion exchange membrane having high permselectivity.

Another object is to provide a membrane of the type described having an extremely low ohmic resistance.

An additional object is to provide a very effective method of producing an anionic membrane which exhibits the high permselectivity and low resistance required for practical industrial applications.

It is another object to furnish an anion exchange membrane which may be readily prepared.

Still another object is to provide an anion exchange membrane in the form of a thin homogeneous finely porous film i.e., having minute pores through which anions may pass.

A further object is to furnish an anion exchange membrane which is chemically stable and is inert to acids and alkalies over prolonged periods of contact therewith.

Yet another object is to produce an anion exchange membrane being substantially thin and yet possessing great film strength.

These and other objects and advantages of the invention will appear throughout the specification.

In certain of its broader aspects, the invention comprises an electropositive selective permeable membrane of a cast intimate mixture of a water-insoluble, acid and alkali-resistant thermoplastic film-forming polymer and a substantially linear electropositive polyelectrolyte, in the form of a finely porous film. The cast film is preferably polar liquid-after treated, i.e., treated with a polar liquid after formation of the film. The polyelectrolyte preferably has a minimum average molecular weight of about 5,000.

In an especially advantageous form, the electropositive or anionic membrane is an intimate mixture of a water-insoluble substantially linear polyvinyl-type thermoplastic film-forming resin and a water-soluble substantially linear polyvinyl-type electropositive polyelectrolyte, in the form of a thin finely perforate film. Preferably, the film is a cast intimate mixture of the polymeric ingredients, i.e., is formed by casting such a mixture. The polyvinyl-type polymers are those derived by the addition polymerization of at least one monoolefinic compound through the unsaturated aliphatic group, and they include the polyvinyl compounds such as polyvinyl chloride, polyvinylpyridine and polystyrene, and their substituted derivatives such as polyvinylidene chloride.

The new method of producing the membrane involves providing an organic solvent solution of preferably a major proportion of the film-forming polymer and a minor proportion of the polyelectrolyte, and casting a film of the polymers therefrom. The solution is provided in a thin layer, and solvent is removed by evaporation, to produce the membrane in the form of a finely porous film. The membrane is thus a homogeneous molecular dispersion of the materials, which is distinct, for example, from the type of mixture obtained when a solid substance is dispersed in another material. Preferably, the film in dry or solid form is contacted with a polar liquid.

A further method in accordance with the invention involves supplying a solution of an electrolyte to an electrolytic cell having the new membrane interposed between the anode and the cathode, and passing an electric current through the cell to displace the anions of the electrolyte from the cathode compartment to the anode compartment. In another useful method, anions are interchanged by diffusion across the membrane. The methods can be carried out in a continuous manner.

The electropositive ion exchange membranes or ionic selective permeable membranes consist of a thin thermoplastic film which is chemically stable, resistant to acids and alkalies and is water insoluble, having incorporated therein a linear electropositive polyelectrolyte having an average molecular weight of at least about 5,000. This polymer contains a plurality of functional groups capable of dissociation in aqueous media into cations which are attached to said polymer and anions capable of migration in the aqueous media.

The electropositive polyelectrolyte is preferably a polyamine, including primary, secondary, tertiary and quaternary amines, preferably the latter. It will be understood that the primary, secondary and tertiary amines are employed in the form of their salts with acids, thus providing the aforementioned cationic groups in the polymers and the migratory anions, which are the anions of the acids.

The composite films are at least 0.0001 inch in thickness and preferably from .001 to .002 inch thick, but they may be thicker. Their electrical resistance, as measured in 0.10 N sodium chloride solution, is not greater than about 1,000 ohms per cm.$^2$ and is preferably not greater than about 300 and, most desirably, 30 ohms or less per cm.$^2$. In composition, these electropositive barriers preferably consist of a plastic film-forming material and at least 10% by weight, preferably up to 30%, and sometimes as high as 60% by weight, of the polyelectrolyte. Excellent films have been produced with between 15–30% by weight of polyelectrolyte contained therein.

The plastic film-forming materials used in the present invention may be of several types both from a standpoint of chemical structure and from physical properties. In order to be operative, the plastic film-forming material must be capable of being cast into a thin homogeneous film from an organic solvent casting solution. This film must be chemically stable, highly resistant to acids and alkalies, and water insoluble, in order to provide ultimately a satisfactory composite membrane film. The film-forming material must also be compatible when dissolved or dispersed in a casting solution with the polyelectrolyte which is incorporated therewith at the time the membrane is cast.

The most useful type of film-forming plastic materials are those derived from the copolymerization of vinyl chloride and acrylonitrile. These polymers may range from between 45 to 80% by weight of vinyl chloride, preferably, between 60% and 80% vinyl chloride, the balance being acrylonitrile. Their specific viscosities at 20° C. are preferably from 0.2 to 0.6 (0.1 gram in 50 cc. acetonyl acetone). Such polymers are described in U.S. Patent 2,420,565. A typical polymer of this type is a commercial material sold under the trade name Dynel. This material contains a major portion of vinyl chloride and a minor portion of acrylonitrile and varies somewhat in its constituents from batch to batch as manufactured. The material as supplied in its filament or fiber form has a specific gravity of 1.31 at 81° F., a tenacity wet or dry of 2.5–3.5 grams per denier and a 42% to 40% elongation wet or dry. The material is soluble in acetone, cyclohexanone and dimethylformamide. It has a strain release beginning at 240° F. and a softening range between 300° to 325° F.

Copolymers containing vinylidene chloride and vinyl chloride in a percent by weight of about 90% to 10% and copolymers of vinylidene chloride and acrylonitrile also have properties useful for adaptation to the present invention. Another type of polymer useful is the copolymers produced by the copolymerization of polyvinyl alcohol and butyraldehyde. This latter copolymerization produces polyacetals whose film-forming properties, when reacted under the proper conditions, are similar to those indicated for the vinyl chloride-acrylonitrile polymers. The above polymers are all copolymers, but homopolymers produced by the polymerization of vinyl chloride and vinylidene chloride are also suitable for practice and use in the present invention.

The above listed polymers are only indicative of the general class of polymers that may be employed. The type of polymer that is useful in the present invention is necessarily limited to its water insolubility, chemical stability, and acid and alkali resistance. It is also limited by its solubility characteristics in organic solvents and its compatibility with the polyelectrolyte with which it is incorporated, as will be hereinafter described. It is noted here, however, that the solvents that are generally used for casting these membranes are in part polar and will tend to precipitate many of the commercially available film-forming plastic materials.

The preferred plastic film-forming polymers are substantially linear and are plastically free of cross linking. Infusible, insoluble substances which are for the most part brittle and tend to crack upon drying are not suitable for use in the invention. In a similar manner, polymers such as cellulose, cellulose acetate, and cellulose nitrate do not have the necessary physical characteristics when formed into films that are necessary for use in this invention.

The preferred plastic film materials have a high degree of plastic flow and are generally clear to opaque in physical appearance. While they are water insoluble, they have the ability to take up a very small part of water or polar organic solvent which, as will be seen subsequently, appears to be important in the process used in producing these membranes.

The preferred polyelectrolytes which impart ionic, and thus also electrophilic, properties to the thin plastic film are substantially free from cross linking. The minimum average molecular weight for these polymers is about 5,000. They are generally water soluble, although this property is not necessary for the purpose of this invention. These polymers, like the film-forming materials, are preferably derived from the homo- or copolymerization of monomers having one olefinic linkage, and they are also characterized as containing a plurality of functional groups which dissociate into cations, attached to the linear chain, and into anions which are free to migrate when in aqueous solutions.

A preferred feature of the invention is the provision of the same type of basic polymer structure in both the film-forming material and the polyelectrolyte, that resulting from the polymerization of vinyl-type monomers. The respective polymers are thus characterized by a high degree of compatibility which results in the formation of a uniform homogeneous membrane.

Of the electropositive polyelectrolytes, the preferred polymers have as their functional group a quaternary ammonium nitrogen atom. This nitrogen atom is preferably attached to the polymer by being associated with an aromatic nucleus which is a side group in the linear chain. By the expression "associated with the aromatic nucleus" is meant to include nitrogen atoms which (a) are a part of the aromatic nucleus, e.g., poly-N-methyl, 2-vinyl-pyridinium iodide; (b) are directly attached to the aromatic nucleus, e.g., polystyrene o- and p-trimethyl ammonium iodide; and (c) are attached to the aromatic nucleus by a divalent hydrocarbon radical, e.g., poly (vinyl benzyl trimethyl ammonium chloride).

In addition to polymers containing a nitrogen atom associated with an aromatic nucleus, quaternized poly-N-vinyl amines and the poly-N-allyl amines may also be used. In the case of these latter compounds care must be used in preparing the quaternary derivatives so that little, if any, cross-linking occurs.

Other polyamines of the type described above may be used, wherein the functional nitrogen atoms are in the form of primary, secondary, or tertiary amino groups converted to the salt form. Due to their lower basicity, they are primarily useful in systems having a pH of about 1 to 5. Additional useful polyamines are those described in U.S. Patent No. 2,625,529, particularly columns 5 and 7, which patent describes synthetic water-soluble polyelectrolytes having a structure derived by the polymerization of at least one monoolefinic compound through the aliphatic unsaturated group, the structure being substantially free of cross-linking.

The polyelectrolytes that give most satisfactory results when employed in this invention are primarily homopolymers derived from the polymerization of one olefinic compound. For example, a poly (vinyl benzyl trialkyl ammonium salt) gives superior results.

In a preferred embodiment of the invention, poly (vinyl benzyl trimethyl ammonium halide, e.g., chloride) is used, prepared for example by the chloromethylation and subsequent amination with trimethylamine of polystyrene. The steps used in preparing this poymer are as follows:

One part by weight of polystyrene having a molecular weight of between 12,000 to 20,000 is dissolved in 10 parts of freshly distilled chloromethyl ether. To this solution is added 0.4–0.5 part of anhydrous zinc chloride. The mixture is stirred at room temperature for 20 hours. At the end of the reaction time, 3 parts of dioxane are added, and the container is chilled in ice. The polymer is precipitated as a pale yellow powder by slowly pouring this solution into about 3.5 times its volume of 50% aqueous alcohol. The product is purified by dissolving it in acetone or dioxane and reprecipitating with the aqueous alcohol.

This reaction results in a chloromethylated polystyrene, as shown by Equation I.

EQUATION I

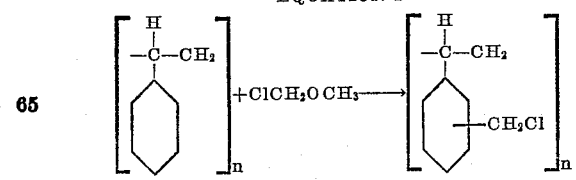

Three parts each of 25% aqueous trimethylamine and methanol are added to a solution of 1 part of the chloromethylated polystyrene and 15 parts of acetone. The reaction proceeds smoothly at room temperature. Precipitation of the polymer occurs within one hour. Enough methanol is added to dissolve the polymer. The solution is allowed to stand for 24 hours, and the quaternary ammonium salt is precipitated by adding the reaction mixture to a large excess of ether. The sample is white when dry, containing 5.1% nitrogen and 14.0% ionic chloride. This amination step is shown in Equation II.

EQUATION II

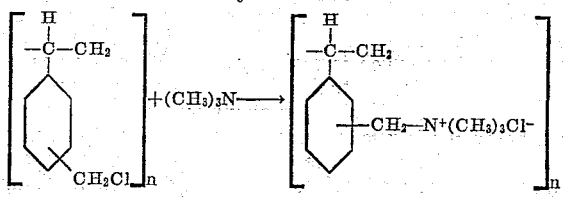

The membranes of the present invention are generally produced by dissolving the plastic film-forming material and the polyelectrolyte in a suitable solvent or solvent system composed of organic liquids. The solvent is then allowed to evaporate with the film being formed by any suitable mechanical means. After the continuous film has been formed and dried, it is then treated with a polar liquid so that a pore structure having a plurality of fixed positive charges is formed.

The plastic film-forming material and the polyelectrolyte generally will be of a nature such that it is necessary or preferable to employ a cosolvent system to uniformly dissolve both of the ingredients. However, in some instances, it has ben found that a single solvent is all that is necessary to form suitable anion membranes. The solvent system must be such that films having a thickness of at least .0003 inch are producible therefrom. The solvent system should dissolve preferably at least 1.6% by weight of the plastic film-forming material and preferably at least .1% of the polyelectrolyte.

Solvents for the preferred vinyl chloride-acrylonitrile film-forming polymers that have given satisfactory results in the invention are acetone, nitromethane, nitroethane, dimethylformamide, cyclopentanone and cyclohexanone. In addition to these solvents, dimethylacetamide, N,N-dimethylacetamide and N,N,N',N'-tetramethyoxamide may be used. Suitable solvents for the polyelectrolyte may be drawn from a wide variety of materials, the selection of solvent being governed by the solubility of the particular polyelectrolyte employed. In general, the best results are obtained by using a low molecular weight aliphatic alcohol having not more than six carbon atoms. A cosolvent system is provided by combining a solvent for the film-forming material with one for the polyelectrolyte.

In the cosolvent systems, excellent results have been obtained by using various ratios of cyclohexanone and methyl alcohol or ethyl alcohol. Thus, for example, membranes were produced very successfully where this system was employed with the plastic film-forming material Dynel, formed by the polymerization of vinyl chloride and acrylonitrile, and poly (vinyl benzyl trimethyl ammonium chloride), identified in the tables as PVBTAC.

In some cases, such as with dimethylformamide, it is not necessary to use an additional solvent for the polyelectrolyte. However, the two-solvent system is preferred due to the fact that the films thus formed generally have greater mechanical strength than those produced from a single solvent system.

In choosing solvents for the dissolution of the plastic film-forming material and the polyelectrolyte, it is preferred that the boiling points of the solvents be less than the point at which the plastic film-forming material tends to exhibit properties of thermoplasticity.

In forming the solutions of the plastic film-forming material and the polyelectrolyte, care is taken in proportioning the solvents, as they will generally be mutually exclusive in their polar and nonpolar characteristics. In the case of poly (vinyl benzyl trimethyl ammonium chloride), the highly polar nature of the material tends to make it extremely soluble in such polar solvents as water and methyl alcohol. Upon the addition of nonpolar solvents, the polyelectrolyte is sometimes coagulated from the solution, thus making it difficult to cast a film containing this material. The correct proportions are determined by simple experimentation.

Thus, for example, a mixture of cyclohexanone or cyclopentanone and methanol in a weight ratio of about 2–8.5:1, or a mixture of cyclohexanone or cyclopentanone and ethanol in a ratio of about 2–7:1, provides a good cosolvent system for the preferred vinyl chloride-acrylonitrile film-forming copolymers and poly (vinyl benzyl trialkyl ammonium salts). Employing a polymer mixture of about 70–90% by weight of film former and 30–10% of polyelectrolyte, and dissolving about 2–8%, by weight of the solution, of the polymer mixture in the cosolvent system, very useful membranes are cast from the solutions.

As a general rule, the more viscous the solution at a given concentration for a given solvent or a solvent system the more desirable the membrane that is cast therefrom. Increased viscosity provides increased mechanical strength in the films.

It is desirable to control the thickness of the films as much as possible. The films, as has been previously indicated, should be at least .0003 inch and preferably from .001 to .002 inch. Satisfactory membranes having thicknesses in excess of 0.005 inch may be produced using the techniques of the invention. In the case of cast Dynel-poly (vinyl benzyl trimethyl ammonium chloride) membranes, the best results have been obtained by using solutions having dissolved therein from 2% to 8% of the Dynel-polyelectrolyte mixture. Excellent results have been obtained by using a 3–4% solution of 80% Dynel and 20% of the polyelectrolyte in a cyclohexanone-methanol or cyclohexanone-ethanol solvent system.

After the plastic film-forming material and the cationic polyelectrolyte have been suitably dissolved in a given solvent or solvent system, they are then formed by any suitable mechanical means into thin films. The basic principle of forming the electropositive membranes of the present invention is based upon the evaporation of the solvent, leaving a film cast upon a suitable surface or mold. The solutions may be passed through a long slot onto a rotating drum, whereby a film forms on the drum and is dried. The film is subsequently peeled off. The material may be poured on a continuous moving belt that has provision for controlled heat which will allow the film to dry. While any of the known commercial methods for forming these films may be employed, the membranes illustrated herein were cast in the following manner:

Three ml. of the casting solution was allowed to spread on a 4-inch by 4-inch by ¼-inch glass plate, and the resulting thin liquid film or layer was dried on a commercial hot plate. The temperature of the glass plate was approximately 95° F. The resulting membrane was removed from the glass plate by soaking in distilled water.

In using the same technique, larger membranes were cast on a larger glass plate measuring 12 inches by 15 inches by ¼ inch which was suspended above a commercial hot plate equipped with an adjustable thermostatic control. When the temperature of the glass plate attained equilibrium, approximately 95 ml. of a casting solution was allowed to spread over the entire surface. The resulting membrane was removed from the glass plate by immersion in deionized water.

In addition to casting membranes by drying them on a glass plate, several were also prepared by drying on a rotating drum. This latter procedure was substantially as follows:

The membranes were cast on a highly polished chromium-plated drum. This drum was rotated on its axis in a horizontal position with an adjustable speed motor and gear assembly. A 250-watt infra red bulb was placed above the drum so that the temperature of the drum could be maintained at the desired value. When the temperature of the drum attained equilibrium, a pan of casting solution was placed under the drum so it extended into the solution approximately ½ inch. The drum was rotated in this casting solution for a period of time, and the pan was removed. Rotation was continued until the membrane dried, and the latter was removed by rotating in a pan of deionized water. Multi-layer films were cast on the rotating cylinder by allowing the previously cast film to set before applying another coating.

In addition to casting the films by the techniques described, several other methods may also be used with equal effectiveness. The films may be formed by building up several thin films by known multiple casting techniques whereby films of varying thicknesses may be prepared.

A feature of the present invention is that the casting solutions may be sprayed upon porous surfaces which act as bases, supports or frameworks to strengthen the films and make them more adaptable for use in electro-mechanical apparatus. In this particular adaptation, extremely thin films may be placed on rigid porous backing members either by spraying or casting technique using dilute solutions. The porous backing members may be of any suitable material, usually non-conductive. Plastic screens, porous ceramic materials, insulated metal screens and the like are suitable. When extremely dilute solutions are used, the films will by natural adhesive forces remain emplaced on the porous backing.

The evaporation of the solvent from the casting solution may be accomplished at room temperature or the temperature may be slightly above room temperature, but in no event should the heat applied exceed the decomposition point of the ingredients of the membrane. In the case of the Dynel and poly (vinyl benzyl trimethyl ammonium chloride) membranes, temperatures ranging from about 70° F. to 145° F. have produced electropositive barriers having satisfactory properties.

The membranes may then be treated with a polar liquid using either of the following two methods. The first method is accomplished by partial leaching with a polar solvent to replace part of the casting solvent. Leaching is broadly defined as the process of washing or extracting soluble constituents from an insoluble material. In the process of this invention a phenomenon similar to the coagulation of suspended solids is apparently also exhibited, centralizing the polyelectrolyte. The leaching process has application in the production of thin membranes that are about .0015 inch and greater in thickness. In carrying out this process, the solvent is evaporated from the solution until the film has taken on a rigid form. The drying time is relatively short. In the case of Dynel-poly (vinyl benzyl trimethyl ammonium chloride) films from cyclohexanone-methanol, a period of about an hour at 100° F. is satisfactory. The membrane is then treated with a polar solvent such as water or a lower aliphatic alcohol for a period of time, e.g., 1–2 hours, after which the solvent is removed by drying. The membrane is then ready for use.

Due to the short drying time, there remains in the pore structure of the plastic film a relatively large amount of the nonpolar solvent. When the membrane is bathed in the polar solvent, large amounts of the nonpolar solvent tend to be displaced. The conditions are controlled to regulate the partial displacement of nonpolar solvent, to avoid the tendency of the structure of the plastic material to become loosened to the point of degradation. When this happens, the membrane loses its physical strength. Good results have been obtained with thicker films by applying the polar solvent to the film with a small atomizer.

In leaching the thicker membranes, it is preferred to use a stock formula in preparing the membranes and to test various leaching solvents as well as drying times, and the amount of solvent and duration of treatment to determine the optimum techniques to be used.

The second method of preparing membranes so that they will contain a plurality of pores having functional electronegative groups contained therein, which is especially useful in treating the thinner membranes, is to prepare membranes having a thickness of approximately .0003–0.0015 inch and to allow them to dry approximately 15 to 70 hours at a temperature of 70° to about 145° F.

In preparing films of this thickness, the thickness of the film may readily be controlled by the amount of plastic film-forming material and polyelectrolyte contained in the solvent or solvent system used to prepare the casting media. For example, in the case of Dynel and poly (vinyl benzyl trimethyl ammonium chloride), casting solutions containing about 3–4% solute which consists of the plastic film-forming material and the polyelectrolyte in the ratio of about four to one have given very good results. By forming the film on a glass plate as described, films generally having a thickness of about .001 inch may be produced and have extremely good electrochemical properties.

When the films are dried for periods of time of about 15–20 hours at about 140° F., the amount of solvent contained in the plastic film-forming material tends to be driven from the pores, and a mechanical tightening or contraction of the film surface tends to take place. At about the end of the 15–20 hour period, the pore areas become relatively fixed and more contracted than in the case of the one-hour drying. Other conditions of time and temperature may be used to obtain the substantially dry films, which conditions can be determined by simple experimentation. At this time, the films are treated with a polar solvent such as water, methyl alcohol, or isopropanol. This latter mode of operation, in preparing the membranes of this invention, may be conveniently referred to as hydration.

By using the hydration technique and keeping the film within the thickness indicated, no special degree of caution need be exercised. The films may remain in the polar solvent for indefinite periods of time, and the hydration, which is fixed by the physical and chemical nature of the films, is uniform since only a given amount of polar solvent will migrate into the film matrix and form a uniform pore structure throughout.

If the membranes are dried to completely, the film tends to contract to a point where any pore structure that might have been formed is diminished to the point that a homogeneous nonpore structure is formed. When this phenomenon occurs, it is more difficult to treat the film so as to render it capable of being used as an electropositive barrier. It is then necessary to place the membrane in the polar solvent for a long period of time to render the pore structure suitable for use as an ionic electropositive barrier.

In the above discussion of the processes of leaching and hydration, it is to be understood that these discussions are theoretical in nature, and it is not intended to rely thereon for the operativeness of this invention. It is sufficient that the membranes may be produced by substantially removing the solvent from the film-forming material, drying the film to partially remove the solvent therefrom, and then preferably treating it with a polar solvent.

Table I shows various exemplary conditions used in preparing membranes. After casting the films, they were soaked in deionized water until the films loosened from the casting surface, about 1–24 hours. The electrochemical properties of these membranes are shown in Table II.

The conductivity and potential measurements of the membranes were accomplished by using the apparatus shown in FIGURES 1 and 2.

FIGURE 1 is a front elevational view of the cell showing the relative position of the chambers for the liquids and electrodes.

FIGURE 2 is a side elevational and sectional view taken on line 2—2 of FIGURE 1 showing the two sections of the cell and the various compartments thereof whereby the conductivities of the membranes were measured.

The cell is composed of a clear solid methyl methacrylate plastic block 1 and a solution chamber 2 comprising two chambers 2a and 2b formed in the middle of the cell sections 1a and 1b. Platinized discs 3a and 3b form the outer ends of each chamber 2a and 2b. At the inner end of each chamber 2a and 2b is an annular projection 4a or 4b formed on the section 1a or 1b, which provides flanged surfaces for clamping the membrane 8

The concentration potentials (E) required for the calculation of the degree of selectivity were determined in the following system:

| Calomel half cell | NaCl (0.1 N) | Membrane | NaCl (0.2 N) | Calomel half cell |

After membrane had been equilibrated in a solution of 0.15 N NaCl for several hours, it was clamped in the cell and the foregoing solutions were flowed past the membrane surfaces at approximately 12.5 milliliters per minute for 20 minutes. The flow rate was then increased to 100 milliliters per minute, and the potential was measured under flow conditions after 250 milliliters of liquid had passed through each cell. The potential was meas-

TABLE I

| Membrane number | Membrane casting solution (composition, percent by weight) | | | | Age, days | Casting conditions | |
|---|---|---|---|---|---|---|---|
| | PVBTAC [1] | Dynel | MeOH | Cyclohexanone | | Temp., °F. | Time, hrs. |
| I | 0.6 | 2.4 | 30.0 | 67.0 | 0 | 95 | 67 |
| II | 0.6 | 2.4 | 30.0 | 67.0 | 0 | 95 | 67 |
| III | 0.7 | 2.8 | 21.5 | 75.0 | 0 | 95 | 18 |
| IV | 0.7 | 2.8 | 21.5 | 75.0 | 0 | 95 | 18 |
| V | 0.8 | 3.2 | 21.0 | 75.0 | 0 | 95 | 18 |
| VI | 0.8 | 3.2 | 21.0 | 75.0 | 0 | 95 | 18 |
| VII | 0.9 | 2.1 | 30.0 | 67.0 | 0 | 95 | 67 |
| VIII | 0.9 | 2.1 | 30.0 | 67.0 | 0 | 95 | 67 |
| IX | 0.6 | 2.4 | 27.0 | 70.0 | 0 | 95 | 18 |
| X | 0.6 | 2.4 | 27.0 | 70.0 | 0 | 95 | 42 |
| XI | 0.6 | 2.4 | 24.0 | 73.0 | 0 | 95 | 18 |
| XII | 0.6 | 2.4 | 24.0 | 73.0 | 0 | 95 | 42 |
| XIII | 0.6 | 2.4 | 20.0 | 77.0 | 0 | 95 | 18 |
| XIV | 0.6 | 2.4 | 20.0 | 77.0 | 0 | 95 | 42 |
| XV | 0.6 | 2.4 | 20.0 | 77.0 | 0 | 95 | 18 |
| XVI | 0.6 | 2.4 | 20.0 | 77.0 | 1 | 95 | 18 |
| XVII | 0.6 | 2.4 | 20.0 | 77.0 | [2] 2 | 95 | 18 |
| XVIII | 0.6 | 2.4 | 20.0 | 77.0 | [2] 3 | 95 | 18 |
| XIX | 0.6 | 2.4 | 20.0 | 77.0 | [2] 6 | 95 | 18 |
| XX | 0.6 | 2.4 | 20.0 | 77.0 | [2] 7 | 95 | 18 |
| XXI | 0.6 | 2.4 | 20.0 | 77.0 | [2] 8 | 95 | 18 |
| XXII | 0.6 | 2.4 | 20.0 | 77.0 | [2] 9 | 95 | 18 |
| XXIII | 0.6 | 2.4 | 20.0 | 77.0 | [2] 14 | 95 | 18 |

[1] PVBTAC equals poly (vinyl benzyl trimethyl ammonium chloride).
[2] White precipitate settling out.

TABLE II

*Composition and properties of anion permeable ion exchange membranes*

| Membrane number | Composition, percent by weight | | Thickness in mils [1] | Resistance of membrane in 0.10 N NaCl, ohms/cm.[2] | Permselectivity of membrane between 0.10/0.20 N NaCl at 25° C. | | | |
|---|---|---|---|---|---|---|---|---|
| | | | | | Concentration potential (E), mv. | | Transport number in membrane (calculated) | |
| | PVBTAC | Dynel | | | Theoretical | Actual | Cation (t+) | Anion (t−) |
| I | 20 | 80 | 0.6 | 6 | −16.3 | −15.1 | 0.035 | 0.965 |
| II | 20 | 80 | 0.7 | 13 | −16.3 | −15.0 | 0.039 | 0.961 |
| III | 20 | 80 | 0.9 | 45 | −16.3 | −15.0 | 0.039 | 0.961 |
| IV | 20 | 80 | 0.8 | 90 | −16.3 | −14.7 | 0.049 | 0.951 |
| V | 20 | 80 | 1.4 | 750 | | | | |
| VI | 20 | 80 | 1.5 | 1,410 | | | | |
| VII | 30 | 70 | 0.5 | 5 | −16.3 | −9.5 | 0.209 | 0.791 |
| VIII | 30 | 70 | 0.5 | 5 | −16.3 | −14.2 | 0.063 | 0.937 |
| IX | 20 | 80 | 0.6 | 26 | −16.3 | −15.5 | 0.025 | 0.975 |
| X | 20 | 80 | 0.8 | 10 | −16.3 | −15.5 | 0.025 | 0.975 |
| XI | 20 | 80 | 0.65 | 18 | −16.3 | −15.5 | 0.025 | 0.975 |
| XII | 20 | 80 | 0.7 | 5 | −16.3 | −15.6 | 0.021 | 0.979 |
| XIII | 20 | 80 | 0.65 | 10 | −16.3 | −15.3 | 0.030 | 0.970 |
| XIV | 20 | 80 | 0.6 | 5 | −16.3 | −15.4 | 0.028 | 0.972 |
| XV | 20 | 80 | 0.9 | 5 | −16.3 | −15.6 | 0.021 | 0.979 |
| XVI | 20 | 80 | 1.0 | 5 | −16.3 | −15.7 | 0.018 | 0.982 |
| XVII | 20 | 80 | 0.8 | 5 | −16.3 | −15.3 | 0.030 | 0.970 |
| XVIII | 20 | 80 | 0.7 | 5 | −16.3 | −15.2 | 0.033 | 0.967 |
| XIX | 20 | 80 | 0.8 | 6 | −16.3 | −15.1 | 0.045 | 0.965 |
| XX | 20 | 80 | 0.8 | 5 | −16.3 | −15.1 | 0.045 | 0.965 |
| XXI | 20 | 80 | 0.9 | 5 | −16.3 | −15.1 | 0.045 | 0.965 |
| XXII | 20 | 80 | 0.8 | 13 | −16.3 | −14.2 | 0.063 | 0.937 |
| XXIII | 20 | 80 | 0.8 | 5 | −16.3 | −14.8 | 0.045 | 0.955 |

[1] Chloride form in deionized water.

between the electrolyte chambers 2. Each section 1a or 1b contains three holes. A hole 5a or 5b is fitted with a calomel electrode (not shown). Perpendicular to the electrode cavity 5a or 5b is an opening 6a or 6b which allows escape of the effluent from the cell. The electrolyte solutions are admitted to openings 7a or 7b and flow into the chambers 2a or 2b.

ured by means of a potentiometer electrically connected to the calomel half cells.

The ohmic resistance of the membrane was determined in the following system:

| Pt | NaCl (0.1 N) | Membrane | NaCl (0.1 N) | Pt |

After the membrane had been equilibrated in a 0.1 N NaCl for several hours, it was clamped in the cell, 0.1 N NaCl was added to each compartment, and the conductivity was determined with a conductivity recorder with three linear micromhos scales, 0–40, 400 and 4,000 (60-cycle instrument), electrically connected to the discs 3a and 3b.

In a further exemplary embodiment of the invention, a six-cell deionizing unit was constructed. The six anion membranes used corresponded to membrane No. XV in Table II.

The six cation membranes were about .0011 inch thick, had a resistance in 0.10 N NaCl of approximately 13 ohms per $cm.^2$ and a permselectivity within about 99% of the theoretical as measured in a 0.10 N | 0.20 N NaCl system. The cation membranes were prepared by casting a 3% solution of 80% Dynel and 20% polystyrene sulfonic acid in 67% of cyclohexanone and 30% of methanol, and drying the film at 94° F. for 17 hours, to produce a film 1.1 mils thick when measured in the sodium form in deionized water. These membranes are disclosed in our copending application Serial No. 511,062, filed May 25, 1955 (Case 401). All the deionizing runs were conducted at 70°±5° F.

A schematic flow diagram of the six-cell multi-compartment unit is shown in FIGURE 3. When direct current is passed through the cell, electrolysis takes place at the electrodes, and the ions entering each deionizing compartment migrate to an adjacent salt waste compartment. Anions move to the right towards the anode through an anion membrane; cations move to the left towards the cathode through a cation membrane. Further movement of the ions out of the salt compartment is blocked by a membrane of similar charge.

The unit was constructed of Lucite. The cathode and anode were flat plates of stainless steel and graphite, respectively. Direct current was supplied with a voltage regulator and a full wave selenium rectifier. Current and voltage were measured by accurate laboratory-type instruments. The specific conductance of the effluent deionized water was recorded continuously.

The area of each deionizing compartment was 0.25 sq. ft., and the total area was 6 times this or 1.5 sq. ft. The unit thus contained 1.5 sq. ft. of cation membrane and 1.5 sq. ft. of anion membrane exposed to flowing water.

The raw water to be deionized was 0.01 N NaCl (29.2 g.p.g. as $CaCO_3$). This water was the only solution fed to the unit, going to both deionized water and waste-producing compartments. The total waste flow was set at 10% of the product deionized water flow, being divided 5% for the salt waste and 2½% for each electrode waste. Electrode waste flows were always downflow; the gases were allowed to bubble up through a column of water in tubing attached to compartment openings. The total holdup of water in the deionized water compartments was 200 ml. or one minute when the flow is 200 ml./min.

The deionizing cells were fed in parallel with raw water upflow from the common inlet channel according to FIGURE 3. The waste compartments were fed similarly with raw water, except in the downflow direction to make the operation countercurrent. The experimental results are given in Table III. The results indicated that the membranes may be employed advantageously in water deionization.

In additional embodiments, several membranes were cast on a glass plate with various aged casting solutions as well as variations in drying temperatures. The results are shown in Table IV. Also, aged solutions are illustrated in Tables I and II. Aging appeared to have deleterious effects at times, as did prolonged drying at higher temperature.

TABLE III

*Deionization of 0.01 N NaCl with multi-compartment cell*

| Run No. | Flow | | Voltage, volts | Current milliamperes | Deionized water | | | Ion leakage, percent |
|---|---|---|---|---|---|---|---|---|
| | ml./min. | g.p.m./sq. ft. | | | Cond., micromhos | Acid-base, g.p.g. as $CaCO_3$ | Cl, g.p.g. as $CaCO_3$ | |
| 1 | 48.8 | 0.0086 | 30 | 160 | 110 | Neutr. | 2.35 | 8.1 |
| 2 | 198 | 0.035 | 70 | 435 | 400 | 0.5 NaOH | 9.4 | 33.3 |

TABLE IV

*Variation of anion-permeable-membrane properties with age of casting solution and drying temperature*

Composition of Membranes and casting solution:

|   | Percent |
|---|---|
| PVBTAC | 0.6 |
| Dynel | 2.4 |
| Methanol | 30.0 |
| Cyclohexanone | 67.0 |

| Membrane No. | Age of casting solution, days | Drying conditions | | Thickness in mils | Resistance of membrane in 0.10 N NaCl, ohms/$cm^2$. | Permselectivity of membrane between 0.10/0.20 N NaCl at 25° C. | | | |
|---|---|---|---|---|---|---|---|---|---|
| | | Temp., °F. | Time, hrs. | | | Concentration potential, mv. | | Transport number in membrane | |
| | | | | | | Theoretical | Actual | Cation | Anion |
| XXIV | 0 | 95 | 18 | 0.8 | 5 | −16.3 | −15.6 | 0.021 | 0.979 |
| XXV | 0 | [1] 95–145 | [1] 18–24 | 0.75 | 5 | −16.3 | −15.8 | 0.015 | 0.985 |
| XXVI | 1 | 95 | 18 | 0.65 | 13 | −16.3 | −15.7 | 0.018 | 0.982 |
| XXVII | 1 | 95–145 | 18–24 | 0.7 | 6 | −16.3 | −15.7 | 0.018 | 0.982 |
| XXVIII [2] | 2 | 95 | 18 | 1.0 | 25 | −16.3 | −15.6 | 0.021 | 0.979 |
| XXIX [2] | 2 | 95–145 | 18–24 | 0.55 | 20 | −16.3 | −15.6 | 0.021 | 0.979 |
| XXX [2] | 3 | 95 | 18 | 0.7 | 23 | −16.3 | −15.5 | 0.025 | 0.975 |
| XXXI [2] | 3 | 95–145 | 18–24 | 0.7 | 45 | −16.3 | −15.6 | 0.021 | 0.979 |

[1] Dried at 95° F. for 18 hours and at 145° F. for 24 hours.
[2] White precipitate settling.

The expression electropositive barrier or membrane is used herein synonymously throughout with the expression anion exchange membrane.

The membranes of the invention when used alone or in conjunction with similar cation membranes are useful in deionizing natural waters and waters containing large amounts of electrolytes such as sea water or many normally occurring brackish waters. They are also useful in removing electrolytes from process liquors such as are encountered in sugar processing operations and the like.

Other applications include concentrating dilute salt solutions, e.g., radioactive waste waters; separating ionic mixtures, as in the production of salt-free caustic and chlorine by the electrolysis of sodium chloride, splitting of neutral salts such as sodium sulfate, preparation of organic bases from their salts and subsequent purification of the base, and electrolytic processes where the cathode and anode products must be kept separated, i.e., battery separators; separation of electrolytes from non-electrolytes in aqueous systems, as in producing silica sols, removing ionic impurities from glycerine, artificial body organs, isolating specific enzymes, and separation of non-electrolytes from electrolytes by diffusion of the former through the membrane (continuous ion exclusion); removing electrolytes from non-electrolytes in non-aqueous systems, as in removing ionic impurities from gasoline, and removing ionic impurities from oil; physical and biological research investigations; and ion interchange by diffusion across membranes as in carbonate and silicate with chloride under countercurrent flow conditions, and salt splitting by exchanging hydrogen ions across a cation membrane or hydroxyl ions across an anion membrane under countercurrent flow conditions.

The invention is hereby claimed as follows:

1. An electropositive selective permeable membrane of a cast homogeneous mixture of 40–90% by weight of a water-insoluble, acid and alkali-resistant thermoplastic film-forming polymer being an addition polymer of at least one mono-olefinic compound polymerized through the olefinic group and 60–10% by weight of a substantially linear water-soluble electropositive polyelectrolyte, said membrane being cast in the form of a finely porous film from a solution of said mixture, being equilibrated in a polar liquid, and having a maximum electrical resistance of 1000 ohms per square centimeter when at equilibrium in one-tenth normal sodium chloride solution.

2. An electropositive selective permeable membrane of a cast homogeneous mixture of 40–90% by weight of a water-insoluble, acid and alkali-resistant substantially linear polyvinyl thermoplastic film-forming polymer and 60–10% by weight of a water-soluble substantially linear polyvinyl electropositive polyelectrolyte, said membrane being cast in the form of a finely porous film from a solution of said mixture, being equilibrated in a polar liquid, and having a maximum electrical resistance of 1000 ohms per square centimeter when at equilibrium in one-tenth normal sodium chloride solution.

3. An electropositive selective permeable membrane of a cast homogeneous mixture of 40–90% by weight of a film-forming vinyl chloride-acrylonitrile copolymer and 60–10% by weight of a water-soluble poly (vinyl benzyl trialkyl ammonium salt) having a minimum average molecular weight of about 5000, said membrane being cast in the form of a finely porous film from a solution of said mixture, being equilibrated in a polar liquid, and having a maximum electrical resistance of 1000 ohms per square centimeter when at equilibrium in one-tenth normal sodium chloride solution.

4. An electropositive selective permeable membrane of a cast homogeneous mixture of 40–90% by weight of a film-forming vinyl chloride-acrylonitrile copolymer and 60–10% by weight of water-soluble poly (vinyl benzyl trimethyl ammonium chloride) having a minimum average molecular weight of about 5000, said membrane being cast in the form of a finely porous film from a solution of said mixture, being equilibrated in a polar liquid, and having a maximum electrical resistance of 1000 ohms per square centimeter when at equilibrium in one-tenth normal sodium chloride solution.

5. An electropositive selective permeable membrane of a cast homogeneous mixture of 70–90% by weight of a film-forming vinyl chloride-acrylonitrile copolymer and of 30–10% by weight of a water-soluble poly (vinyl benzyl trialkyl ammonium salt) having a minimum average molecular weight of about 5000, said membrane being cast in the form of a finely porous film from a solution of said mixture, being equilibrated in a polar liquid, and having a maximum electrical resistance of 1000 ohms per square centimeter when at equilibrium in one-tenth normal sodium chloride solution.

6. The method of producing an electropositive selective permeable membrane which comprises providing an organic solvent solution of a homogeneous mixture of 40–90% by weight of a water-insoluble, acid and alkali-resistant thermoplastic film-forming polymer being an addition polymer of at least one mono-olefinic compound polymerized through the olefinic group and 60–10% by weight of a substantially linear water-soluble electropositive polyelectrolyte, casting a film of the polymers therefrom, and contacting the film with a polar liquid until equilibrium is reached with said polar liquid to produce a porous film structure containing a plurality of fixed positive charges providing a selective permeable membrane having a maximum resistance of 1000 ohms per square centimeter when at equilibrium in one-tenth normal sodium chloride solution.

7. The method of producing an electropositive selective permeable membrane which comprises providing an organic solvent solution of a homogeneous mixture of 40–90% by weight of a water-insoluble, acid and alkali-resistant substantially linear polyvinyl thermoplastic film-forming polymer and 60–10% by weight of a water-soluble substantially linear polyvinyl electropositive polyelectrolyte, forming said solution in a thin layer, removing solvent from the layer by evaporation and contacting the layer with a polar liquid until equilibrium is reached with said polar liquid to produce a porous film structure containing a plurality of fixed positive charges providing a selective permeable membrane having a maximum resistance of 1000 ohms per square centimeter when at equilibrium in one-tenth normal sodium chloride solution.

8. The method of producing an electropositive selective permeable membrane which comprises providing an organic solvent solution of a homogeneous mixture of 40–90% by weight of a film-forming vinyl chloride-acrylonitrile copolymer and 60–10% by weight of a water-soluble poly (vinyl benzyl trialkyl ammonium salt) having a minimum average molecular weight of about 5000, forming said solution in a thin layer, removing solvent from the layer by evaporation to provide a film in dry form, and contacting the film with a polar liquid until equilibrium is reached with said polar liquid to produce a porous film structure containing a plurality of fixed positive charges providing a selective permeable membrane having a maximum resistance of 1000 ohms per square centimer when at equilibrium in one-tenth normal sodium chloride solution.

9. The method of producing an electropositive selective permeable membrane which comprises providing about a 2–8% solution in about 2 to 8.5–1 cyclohexanone-methanol of a mixture of about 70–90% of a film-forming vinyl chloride-acrylonitrile copolymer and the balance of a water-soluble poly (vinyl benzyl trimethyl ammonium halide) having a minimum average molecular weight of about 5000, forming said solution in a thin layer, removing solvent from the layer by evaporation and contacting the layer with a polar liquid until equilibrium is reached with said polar liquid to produce a porous film structure containing a plurality of fixed positive charges providing a selective permeable membrane having a maximum resistance of 1000 ohms per square centimeter when at equilibrium in one-tenth normal sodium chloride solution.

10. The method of producing an electropositive selective permeable membrane which comprises providing about a 2–8% solution in about 2 to 7–1 cyclohexanone-ethanol of a mixture of about 70–90% of a film-forming vinyl chloride-acrylonitrile copolymer and the balance of a water-soluble poly (vinyl benzyl trimethyl ammonium halide) having a minimum average molecular weight of about 5000, forming said solution in a thin layer, removing solvent from the layer by evaporation, and contacting the layer with a polar liquid until equilibrium is reached with said polar liquid to produce a porous film structure containing a plurality of fixed positive charges providing a selective permeable membrane having a maximum resistance of 1000 ohms per square centimeter when at equilibrium in one-tenth normal sodium chloride solution.

11. The method which comprises supplying a solution of an electrolyte to an electrolytic cell having an electropositive selective permeable membrane interposed between the anode and the cathode to form corresponding compartments, and passing an electric current through the cell to displace the anions of the electrolyte from the cathode compartment to the anode compartment, said membrane being a cast homogeneous mixture of 40–90% by weight of a water-insoluble, acid and alkali-resistant thermoplastic film-forming polymer being an addition polymer of at least one mono-olefinic compound polymerized through the olefinic group, and 60–10% by weight of a substantially linear water-soluble electropositive polyelectrolyte, said membrane being cast in the form of a finely porous film from a solution of said mixture and having a maximum electrical resistance of 1000 ohms per square centimeter when at equilibrium in one-tenth normal sodium chloride solution.

12. An electropositive selective permeable membrane comprising a homogeneous molecular dispersion 70–90% by weight of a water-insoluble, acid and alkali-resistant thermoplastic film-forming polymer being an addition polymer of at least one mono-olefinic compound polymerized through the olefinic group, and 30–10% by weight of a water-soluble substantially linear electropositive polyelectrolyte, in the form of a finely porous film, said membrane being equilibrated in a polar liquid and having a maximum electrical resistance of 1000 ohms per square centimeter when at equilibrium in one-tenth normal sodium chloride solution.

13. An electropositive selective permeable membrane consisting of a homogeneous molecular dispersion of 40–90% by weight of a copolymer of about 45% to 80% by weight of vinyl chloride and the balance acrylonitrile, and 60–10% by weight of a water-soluble poly (vinyl benzyl trialkyl ammonium salt) and having a minimum average molecular weight of about 5000, in the form of a finely porous film, said membrane being equilibrated in a polar liquid and having a maximum electrical resistance of 1000 ohms per square centimeter when at equilibrium in one-tenth normal sodium chloride solution.

14. The method for transferring anions from one liquid region to another while excluding cations which comprises interposing an electropositive selective permeable membrane between said regions being in contact with opposite sides of said membrane, said membrane being a homogeneous molecular dispersion of 40–90% by weight of a water-insoluble, acid and alkali-resistant thermoplastic film-forming polymer being an addition polymer of at least one mono-olefinic compound polymerized through the olefinic group and 60–10% by weight of a substantially linear water-soluble electropositive polyelectrolyte, in the form of a finely porous film, said membrane being equilibrated in a polar liquid and having a maximum electrical resistance of 1000 ohms per square centimeter when at equilibrium in one-tenth normal sodium chloride solution.

15. The method defined in claim 11 wherein said membrane consists of 40–90% by weight of a copolymer of about 45–80% by weight of vinyl chloride and the balance acrylonitrile, and 60–10% by weight of a water-soluble poly (vinyl benzyl trialkyl ammonium salt) having a minimum average molecular weight of about 5000.

References Cited in the file of this patent

UNITED STATES PATENTS

| | | |
|---|---|---|
| 2,510,262 | Sollner | June 6, 1950 |
| 2,527,863 | Webb | Oct. 31, 1950 |
| 2,688,008 | Chaney | Aug. 31, 1954 |
| 2,723,229 | Bodamer | Nov. 8, 1955 |
| 2,730,768 | Clarke | Jan. 17, 1956 |
| 2,731,408 | Clarke | Jan. 17, 1956 |

OTHER REFERENCES

Meyer: "Natural and Synthetic High Polymere," vol. IV, 2 ed. (1950), pp. 817 and 818.

UNITED STATES PATENT OFFICE
CERTIFICATE OF CORRECTION

Patent No. 3,004,909                  October 17, 1961

Harry P. Gregor et al.

It is hereby certified that error appears in the above numbered patent requiring correction and that the said Letters Patent should read as corrected below.

Column 5, line 45, for "plastically" read -- practically --; column 6, line 44, for "poymer" read -- polymer --; column 7, line 28, for "ben" read -- been --; column 10, line 47, for "to" read -- too --.

Signed and sealed this 17th day of April 1962.

(SEAL)
Attest:

ESTON G. JOHNSON                  DAVID L. LADD

Attesting Officer                  Commissioner of Patents